United States Patent [19]
Johnson

[11] Patent Number: 5,423,114
[45] Date of Patent: Jun. 13, 1995

[54] TOOL FOR MANUALLY DISMANTLING PALLETS

[76] Inventor: John L. Johnson, 934 NE. 77th Ave., Portland, Oreg. 97213

[21] Appl. No.: 65,654

[22] Filed: May 21, 1993

[51] Int. Cl.6 .............................................. B23P 19/04
[52] U.S. Cl. ........................................ 29/267; 254/131
[58] Field of Search ............... 254/131, 25, 131.5, 254/17; 81/45, 46; 30/312; 29/267

[56] References Cited

U.S. PATENT DOCUMENTS

| | | | |
|---|---|---|---|
| 1,389,183 | 8/1921 | Burke | 254/131 |
| 1,644,070 | 10/1927 | Martin | 29/267 |
| 2,195,667 | 4/1990 | Baker | 254/131 |
| 5,181,694 | 1/1993 | Collins | 254/131 |

FOREIGN PATENT DOCUMENTS 2403740  8/1975  Germany .............................. 254/131

Primary Examiner—Robert C. Watson
Attorney, Agent, or Firm—Eugene M. Eckelman

[57] ABSTRACT

A pallet dismantling tool having a body member, a handle, and lever extensions. The handle is mounted on the body member in angular relation to the lever extensions for forming leveraged functioning of the latter to pry off pallet deck boards when the handle is operated to rotate the body member. In one embodiment, a plurality of jaw members comprise the lever extensions and have forwardly opening slots that receive a deck board of a pallet edgewise. The jaw members are selectively arranged in number and position corresponding to that of the pallet spacers when engaging a deck board whereby to remove a deck board simultaneously from all the spacers. The jaw members are adjustable to accommodate different structures and sizes of pallets.

4 Claims, 2 Drawing Sheets

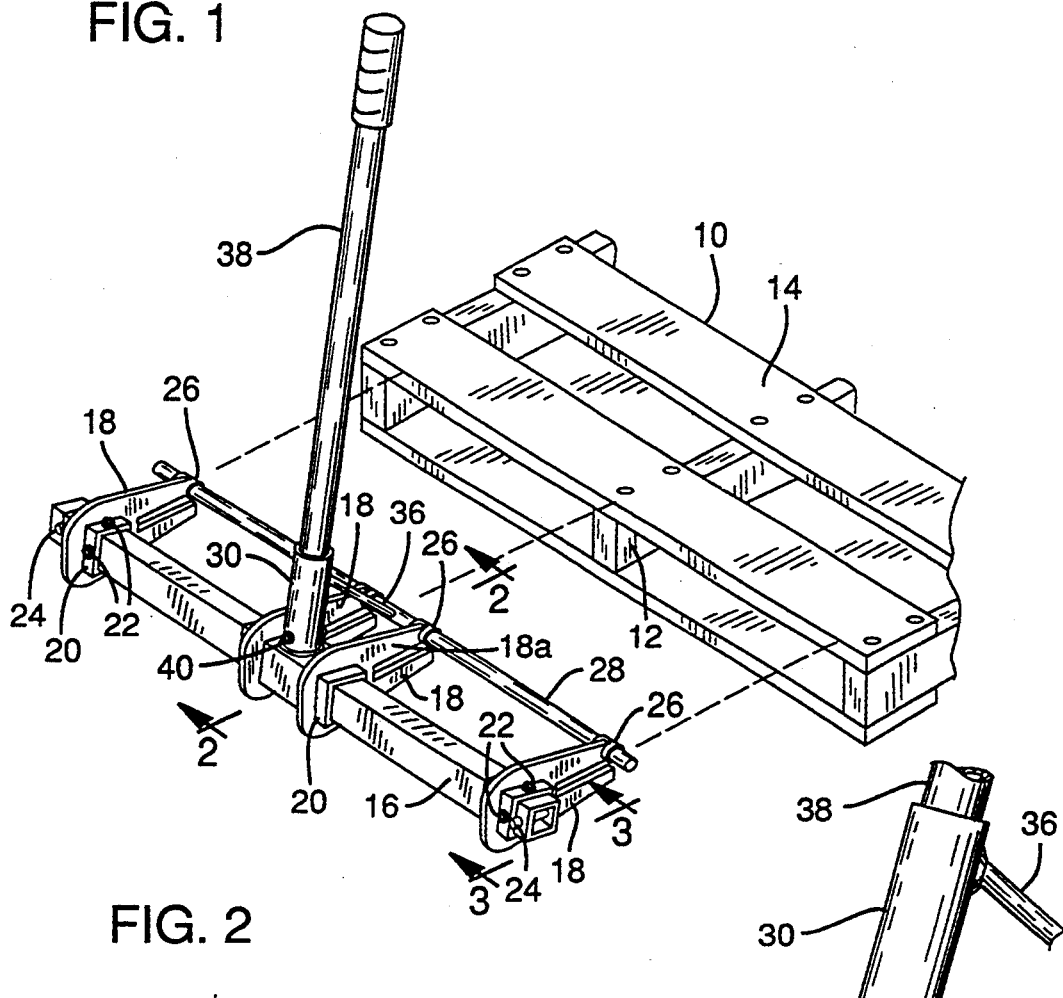
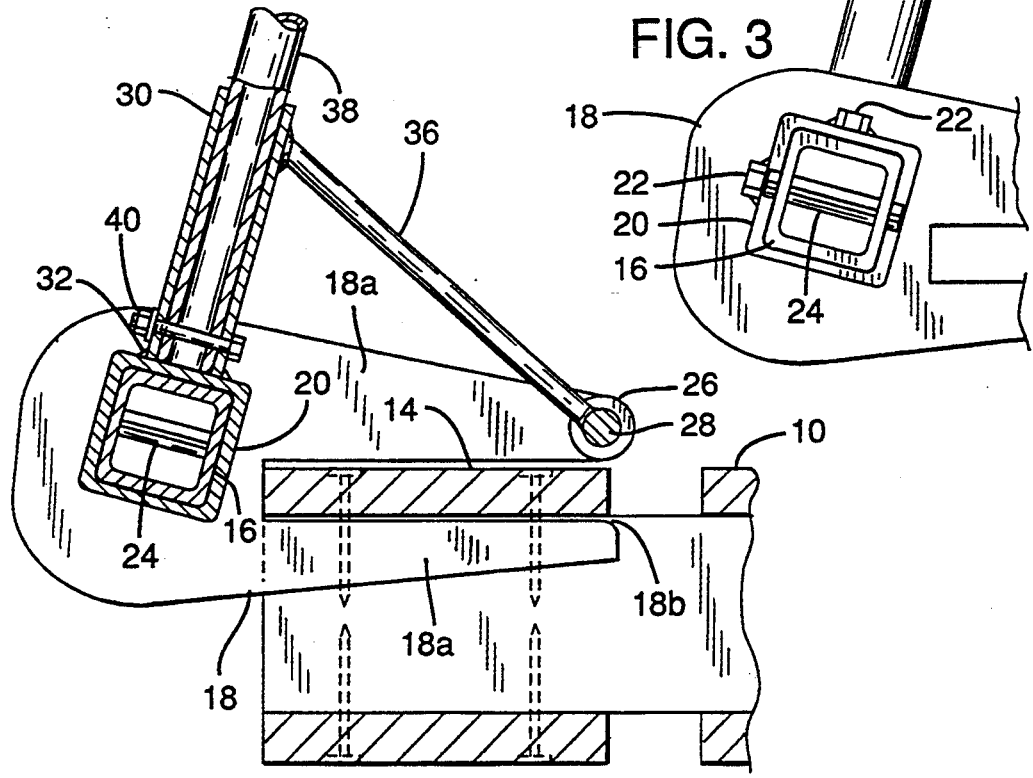

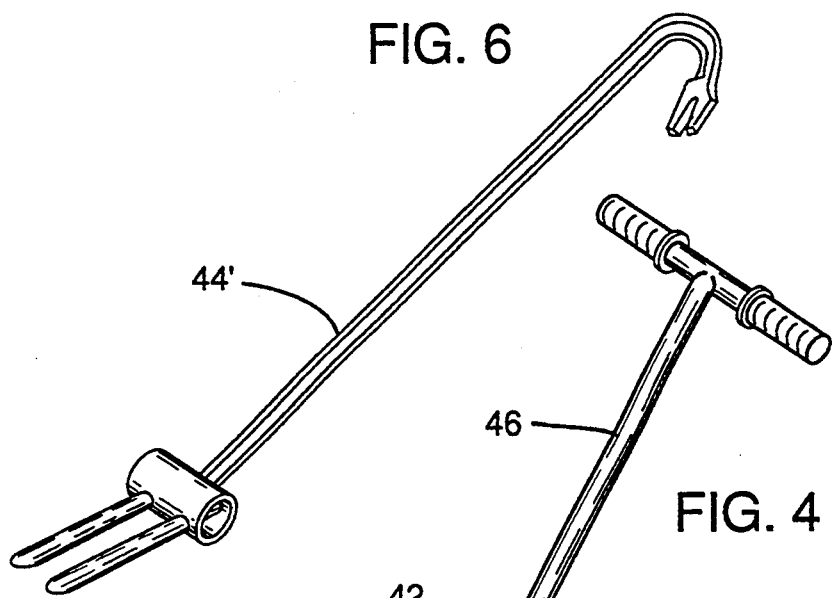
FIG. 6
FIG. 4
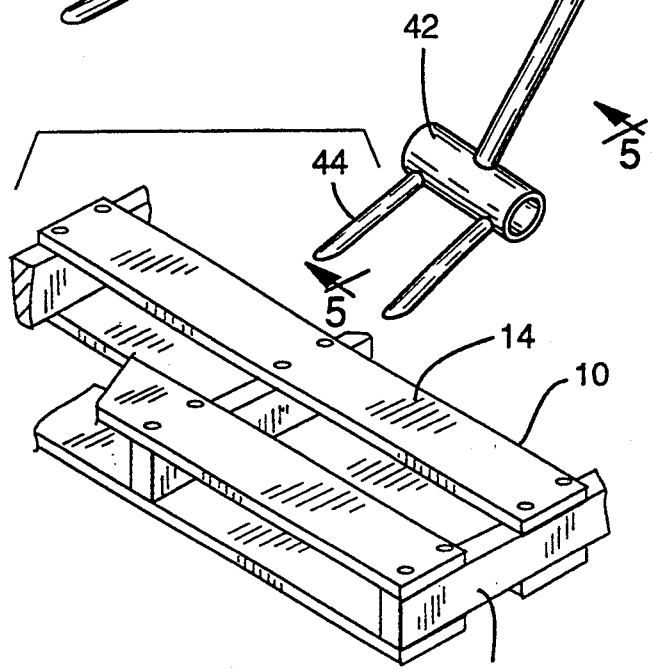
FIG. 5
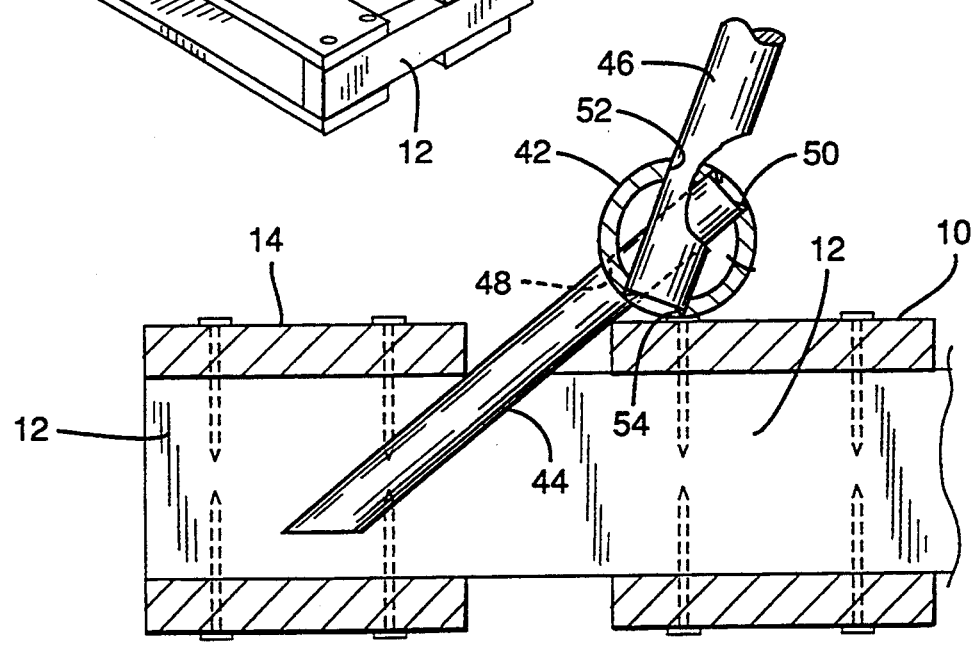

5,423,114

TOOL FOR MANUALLY DISMANTLING PALLETS

BACKGROUND OF THE INVENTION

This invention relates to new and useful improvements in tools for manually dismantling pallets.

Wooden pallets are extensively used for stacking products to be transported or stored. These pallets use spacers, such as longitudinal stringers or longitudinally spaced blocks secured by nails to top and bottom deck boards, for spacing and connecting the deck boards to the stringers or blocks. Spacing of the deck boards allows access into the pallet by the forks of a lift truck. Power devices have been used that efficiently dismantle pallets in order that they can be repaired, compacted for discarding them, or the lumber reused. A power device for dismantling pallets is shown in applicant's U.S. Pat. No. 5,211,094. Some pallet handlers manually dismantle the pallets, however, and various tools have been used for this purpose. In some cases the deck boards are merely pried off by crowbars, etc. In most cases of manual dismantling, breaking and splintering of the deck boards occurs which means that the deck boards cannot be reused.

SUMMARY OF THE INVENTION

An object of the invention is to provide hand tool means directed to the manual dismantling of pallets or parts thereof with efficiency for repair, salvage, or recycling.

More particular objects of the invention are to provide a pallet dismantling tool that in one embodiment engages the pallet at multiple stringer or block positions simultaneously and causes the deck boards to be efficiently pried off without damage; that employs a novel lever structure that allows operation thereof by a person with only average strength; and that is rugged in operation and economical to manufacture.

Another object is to provide an embodiment that is capable of removing a single deck board if necessary, including a deck board that is intermediate the end of boards.

In carrying out the objects of the invention, an embodiment of the invention includes an elongated body member having a central portion and outer end portions. A plurality of jaw members extend rigidly forward from the body portion and have slot means capable of receiving a deck board of a pallet. A handle extends from the body member in angular relation to said jaw members and in rigid support on said body member for forming a leveraged operation of the jaw members for prying off a deck board. The jaw members are selectively arranged in number and position corresponding to that of the pallet spacers whereby to remove a deck board simultaneously from all the spacers. Some of the jaw members are adjustable on the body member to adjust to different spacing of the pallet spacers. Another embodiment of the invention includes structure that can remove a single deck board that is intermediate the ends.

BRIEF DESCRIPTION OF THE DRAWINGS

FIG. 1 is an isometric view of an embodiment of the present tool adapted to have engagement with a pallet at multiple stringers or blocks, this view including a fragmentary portion of a pallet for illustrating the function of the tool.

FIG. 2 is an enlarged sectional view taken on the line 2—2 of FIG. 1.

FIG. 3 is a fragmentary end elevational view taken on the line 3—3 of FIG. 1.

FIG. 4 is an isometric view of another embodiment of the invention.

FIG. 5 is an enlarged sectional view taken on the line 5—5 of FIG. 4 and showing operation of the embodiment of FIG. 4; and FIG. 6 is an isometric view of a further embodiment.

DETAILED DESCRIPTION OF PREFERRED EMBODIMENTS

With particular reference to the drawings, the invention is concerned with the manual dismantling of conventional wooden pallets 10 having longitudinal stringers 12, usually three, but occasionally more or less, and a suitable number of top and bottom deck boards 14 across the stringers. Some pallets use blocks, not shown, spaced longitudinally of the pallet rather than stringers. The stringer type pallet is illustrated herein merely for explaining the invention but it is to be understood that the invention is functional as well with the block type spacers.

The tool embodiment shown in FIGS. 1–3 includes multiple point engagement with a board of the pallet, i.e. at each stringer for removal of a deck board simultaneously at all its nailed points. The tool comprises a lever having a rectangular tubular body member 16 of a length equal to at least the width of a pallet. Four identical jaw members 18 having jaw extensions 18a are supported on this body member by hollow support hubs 20 integral with the jaw members. These hubs fit on the body member and project a short distance beyond the outer sides of the jaw members. The body member 16 and the hubs 20 are tilted forwardly at approximately 15° relative to the general longitudinal direction of the jaw members.

Two of the jaw members are disposed centrally of the tool on a common hub 20 and a jaw member is disposed at each end. The two outer hubs have set screw means 22 on two sides thereof. Jaw extensions 18a have a front opening slot 18b between them that is capable of receiving deck boards edgewise. In the assembly of the present tool, the hub 20 of the center jaw members is welded to the body member 16 in a precisely located position, usually the center. The two outer jaw members are positioned outwardly toward the ends of the body member and may or may not be secured in a fixed position, as will be more apparent hereinafter. End split pin keepers 24 prevent end displacement of the two outer jaw members. The spacing of the two central jaw members is such that they can receive between them most pallet stringers of conventional width, including a double width stringer, or such spacing can be customized according to stringer width.

The upper tips of the jaw member extensions 18a have a socket or ring 26 formed integrally thereon. These sockets are aligned laterally and support a cross rod 28. The two center jaw members are welded to the rod 28 but the end jaw members are free to be adjusted therealong upon loosening their set screw means 22.

A handle socket tube 30 is welded on the top of the central hub 20 at substantially a right angle to its hub. Since the hub is tilted forwardly, the handle will also tilt forward relative to the jaw members. Handle socket tube 30 is reinforced by a gusset strip 36 welded angularly between it and the front cross rod 28 and receives a handle 38 therein. Releasable connection of the handle to the socket 30 is by a bolt 40.

In the operation of the tool of FIGS. 1–3, it is lined up with a pallet to be dismantled such that the jaw members face the open end of the pallet and the center jaw member assembly faces the center stringer for straddling relation. The end jaw members are adjusted so as to be of slightly less spacing than the width of the outer stringers. The tool is then moved into engagement with the pallet with the rod 26 riding on the top of the deck boards and the jaw slots 18b receiving the front deck board edgewise as shown in FIG. 2. The bottom jaw extension of the end jaw members passes along the inner side of the outer stringers and the bottom jaw extensions of the central jaw members straddle the center stringer. The handle is then forcibly moved forward, or backward if desired, to apply a leverage or lifting force to the deck board. Since the handle is already tilted forwardly, a good leverage is initiated in this direction. When the handle is moved forwardly, the fulcrum point is at the upper tip of the jaw members 18. When the handle is pulled back, the fulcrum point of the lever is at the base of the jaw members. In either of the operator forced directions of rotation, the board is loosened at all stringers or blocks simultaneously. The tool is worked down the pallet for removing all the boards if desired or remove only the lead board if that is all that is necessary. The pallet can then be turned over to remove bottom boards if desired. The end jaw members being adjustable can be made to accommodate various pallet widths. These end jaw members can be locked in place by the set screws if a similar bunch of pallets is being worked on or if desired the set screws can be backed off to allow the operator to move the jaw members for specific pallets. As stated, the space between the two central jaw members is wide enough to receive most conventional center stringers and blocks, or if desired this spacing can be customized during manufacture.

The present structure thus comprises a pallet dismantling tool that has good leverage and only an average manual force is necessary to operate the lever to remove a board. This multiple point jaw engagement requires less force to operate than a single tool, such as a crowbar, since the nailed points of one stringer do not resist loosening of another nailed point but instead all of these points are simultaneously loosened.

FIGS. 4 and 6 illustrate embodiments of the invention that also use a leverage type force. These tools are designed for removing a single board and usually a board that is intermediate the end boards of the pallet. In the structure of FIG. 4, a body member 42 in the form of a tube segment has two forward projecting strong tines 44 thereon. Handle 46 projects oppositely from the tines at about 130°. In the securement of the tines to the body member, the latter has diametral bores 48 that receive the tines. In a preferred structure, the tines fit snugly in their bores but in addition such tines are welded to the body member at their far ends 50, namely, at the end opposite from the tip end. The welds are thus protected from forces or strains and this makes for a rugged, substantially unbreakable structure. Strong securement of the handle 46 is similar to that of the tines in that this handle is fitted in a bore 52 in the body member in fitted engagement and has a weld connection 54 only at the bottom end.

In the use of the tool of FIG. 4 the operator works from the top of the pallet as seen in FIG. 5. The tines are inserted down between a space adjacent the board to be removed. The handle is then rotated down with the body member 42 thereof acting as the fulcrum point on the top surface of the pallet. The tines thus press up against the board and pry it off the stringers.

FIG. 6 has the same structure and operation as that illustrated in connection with FIG. 4 except that the handle 44' is in the form of a crowbar.

It is to be understood that the forms of my invention herein shown and described are to be taken as a preferred example of the same and that various changes in the shape, size and arrangement of parts may be resorted to without departing from the spirit of my invention, or the scope of the subjoined claims.

Having thus described my invention, I claim:

1. A dismantling tool for pallets of the type having top and bottom deck boards and a plurality of longitudinally arranged spacers therebetween to provide for spaces arranged to receive the forks of a lift truck, said tool comprising:

an elongated body member having a central portion and outer end portions, a plurality of jaw members extending rigidly forward on said body portion and capable of engaging a deck board of a pallet, and a handle extending angularly relative to said jaw members and in rigid support on said body member for forming leveraged operation of said jaw members to pry off a deck board, said jaw members being selectively arranged in number and position corresponding to that of the pallet spacers when engaging a deck board whereby to remove a deck board simultaneously from all the spacers, said jaw members including a pair of said jaw members located adjacent the center of said body portion and one each on the outer ends of said body portion, the jaw members at the outer ends of said body portion being adjustable laterally on said body portion to adjust the different spacing of the pallet spacers.

2. The dismantling tool of claim 1 including a front rod extending parallel to said body portion, said rod being secured integrally to the jaw members that are located adjacent the center of said body portion and being slidably engaged by the jaw members at the outer ends of said body portion.

3. A dismantling tool for pallets of the type having vertically spaced, horizontal top and bottom deck boards and a plurality of longitudinally arranged spacers therebetween to provide for spaces arranged to receive the forks of a lift truck, said tool comprising:

an elongated body member having a central portion and outer end portions, a plurality of jaw members extending rigidily forward on said body portion and capable of engaging a top deck board of a pallet, and a handle extending angularly relative to said jaw members and in rigid support on said body member for forming leveraged operation of said jaw members to pry off a deck said jaw members each comprising upper and lower portions defining a forwardly opening slot that is capable of said engagement with a top deck board by receiving the top deck board edgewise therein, the lower portion of said jaw members having a height less than a vertical space between top and bottom deck boards whereby to work in the space between top and bottom deck boards in prying off boards.

4. The dismantling tool of claim 5 wherein said jaw members are three in number and are capable of positioning adjacent respective spacers of a pallet using three spacers whereby to remove a deck board simultaneously from all the three spacers.

* * * * *